(12) United States Patent
Fu et al.

(10) Patent No.: US 8,935,125 B1
(45) Date of Patent: Jan. 13, 2015

(54) INTERNAL CABLE CALIBRATION AND COMPENSATION

(75) Inventors: Wei Fu, San Diego, CA (US); Christopher Thomas, San Diego, CA (US)

(73) Assignee: SMSC Holdings S.a.r.l., Luxembourg (LU)

( * ) Notice: Subject to any disclaimer, the term of this patent is extended or adjusted under 35 U.S.C. 154(b) by 609 days.

(21) Appl. No.: 13/035,710

(22) Filed: Feb. 25, 2011

(51) Int. Cl.
*H04L 1/00* (2006.01)

(52) U.S. Cl.
USPC .......................................................... 702/181

(58) Field of Classification Search
CPC . H04L 1/0042; H04L 1/243; H04L 25/03878; H04L 25/85; H04B 3/462; H04B 3/464; H04B 3/466
USPC .......................................................... 702/191
See application file for complete search history.

(56) References Cited

U.S. PATENT DOCUMENTS

| | | | | |
|---|---|---|---|---|
| 5,673,133 | A * | 9/1997 | Imaoka et al. | 398/202 |
| 7,236,108 | B2 * | 6/2007 | Cheng et al. | 341/59 |
| 7,375,532 | B1 * | 5/2008 | Lo et al. | 324/534 |
| 7,426,235 | B1 * | 9/2008 | Anderson et al. | 375/221 |
| 7,848,404 | B2 * | 12/2010 | An et al. | 375/233 |
| 8,179,144 | B1 * | 5/2012 | Lo et al. | 324/533 |
| 2003/0235253 | A1 * | 12/2003 | Dally | 375/259 |
| 2005/0264299 | A1 * | 12/2005 | Manani et al. | 324/539 |
| 2006/0166525 | A1 * | 7/2006 | Yamakami et al. | 439/67 |
| 2007/0132485 | A1 * | 6/2007 | Alon et al. | 327/18 |
| 2008/0069191 | A1 * | 3/2008 | Dong et al. | 375/219 |
| 2008/0109180 | A1 * | 5/2008 | Keady et al. | 702/89 |
| 2009/0030635 | A1 * | 1/2009 | Horan et al. | 702/85 |
| 2010/0283532 | A1 * | 11/2010 | Horan et al. | 327/530 |
| 2012/0087405 | A1 * | 4/2012 | Cheung et al. | 375/232 |

OTHER PUBLICATIONS

Ruifeng Sun, "A Low-Power 20-Gb/s Continuous-Time Adaptive Passive Equalizer", 2005, Carnegie Mellon University, pp. 1-71.*

* cited by examiner

*Primary Examiner* — Janet Suglo
*Assistant Examiner* — Michael Dalbo
(74) *Attorney, Agent, or Firm* — King & Spalding L.L.P.

(57) ABSTRACT

Systems and methods are provided to calibrate and compensate for signal impairments from the use of cables in data communication devices. Signal impairments such as intra-pair skew of differential signals and frequency dependent insertion loss are measured during a calibration phase. One end of the cable is connected to a communication device. The other end of the cable is configured to loop back calibration signals transmitted from the communication device. The calibration signals looped back from the communication device are received and measured by the communication device. The measured impairments are used to determine transmit and receive impairment compensation settings to compensate for impairments caused by the cable. These settings are stored and used to adjust signals transmitted from the communication device to compensate for the transmit impairment. These setting are also used to adjust signals received by the communication device to compensate for the receive impairment.

20 Claims, 8 Drawing Sheets

INTERNAL CABLE CALIBRATION AND COMPENSATION

BACKGROUND

1. Field of the Invention

The present invention generally relates to data communication and, more particularly, to calibration and compensation of signal impairments introduced by cable interconnects used for data communication.

2. Related Art

Data communication standards are defined to ensure interoperability between communicating devices. Wired-line communication standards may also define requirements and tolerances for data cables through which the devices communicate. For example, a widely used data communication standard for communicating between computers and peripheral devices is Universal Serial Bus (USB). USB signals are transmitted differentially through twisted-pair wires inside data cables. These data cables introduce impairments on the signals due to cable parasitics, resistive loss, impedance mismatch, or other factors. These impairments may include as intra-pair skew of the differential signals, insertion loss, crosstalk, and other types of degradation to the signals. Critically, as data rate goes up, minimizing signal impairments and maintaining signal integrity become even more important because signals become less tolerant to impairments. For example, at the USB 3.0 data rate of 4.8 Gbits/second, minimizing signal impairments is critical to ensure reliable data communication. While the USB 3.0 standard defines strict tolerances on signal impairments for data cables used between devices, the standard is less well defined for internal data cables used inside the devices. As a result, a USB 3.0 device may pass a compliance test, but may fail in the field after the device is connected to an internal data cable due to signal impairments introduced by the internal data cable.

Accordingly, there is a need for techniques to calibrate and compensate for signal impairments introduced by internal cables used in data communication devices, especially high speed data communication devices such as those using USB 3.0.

SUMMARY

Systems and methods are provided to calibrate and compensate for signal impairments from the use of internal cables in data communication devices. Signal impairments such as intra-pair skew of differential signals and frequency dependent insertion loss are measured during a calibration phase. The measured impairments are used to determine transmit and receive impairment compensation settings. These settings are stored and used to compensate impairments on the data signals when transmitting data to or receiving data from external devices using the internal cables.

In accordance with one or more embodiments of the present disclosure, a method includes connecting one end of a cable to a communication device. The method also includes configuring the other end of the cable to loop back to the communication device signals transmitted from the communication device to calibrate a signal impairment introduced by the cable. The method further includes transmitting a calibration signal from the communication device. The method further includes receiving the calibration signal from the second end of the cable as a looped back signal at the communication device. The method further includes measuring the looped back signal. The method further includes determining from the measuring of the looped back signal the signal impairment introduced by the cable. The signal impairment includes a transmit impairment on signals transmitted from the communication device through the cable. The signal impairment also includes a receive impairment on signals received by the communication device through the cable. The method further includes configuring the cable for normal operation. The method further includes adjusting the signals transmitted from the communication device to compensate for the transmit impairment. The method further includes adjusting the signals received by the communication device to compensate for the receive impairment.

In accordance with one or more embodiments of the present disclosure, an apparatus includes a controller adapted to transmit a calibration signal from a communication device to calibrate a transmit impairment and a receive impairment introduced by a cable connected to the communication device. The cable is configured by a calibration connector to loop back the calibration signal. The apparatus also includes a calibration measurement memory adapted to store the transmit impairment and the receive impairment. The apparatus further includes an impairment compensation module. The impairment compensation module is adapted to receive the transmit impairment and the receive impairment from the calibration measurement memory. The impairment compensation module is also adapted to adjust signals transmitted from the communication device to compensate for the transmit impairment, and to adjust signals received by the communication device to compensate for the receive impairment.

In accordance with one or more embodiments of the present disclosure, a machine readable medium of non-transitory instructions is provided. When executed by one or more processors of a device, the instructions cause the device to transmitting a calibration signal from a communication device to calibrate a signal impairment introduced by a cable connected to the communication device. The cable is configured to loop back the calibration signal. The device also measures the looped back calibration signal. The device further determines a transmit impairment on signals transmitted from the communication device introduced by the cable from measurements of the looped back calibration signal. The device further determines a receive impairment on signals received by the communication device introduced by the cable from measurements of the looped back calibration signal. The device further adjust signals transmitted from the communication device to compensate for the transmit impairment. The device further adjust signals received by the communication device to compensate for the receive impairment.

The scope of the invention is defined by the claims, which are incorporated into this section by reference. A more complete understanding of embodiments of the present invention will be afforded to those skilled in the art, as well as a realization of additional advantages thereof, by a consideration of the following detailed description of one or more embodiments. Reference will be made to the appended sheets of drawings that will first be described briefly.

BRIEF DESCRIPTION OF THE FIGURES

Embodiments of the present invention and their advantages are best understood by referring to the detailed description that follows. It should be appreciated that like reference numerals are used to identify like elements illustrated in one or more of the figures.

DETAILED DESCRIPTION

Techniques are provided which may be used to calibrate and compensate signal impairments introduced by data cables, including internal cables, during data transmit (Tx) operations and data receive (Rx) operations of a data communication device. During a calibration phase using a calibration setup, signal impairments such as intra-pair skew of differential signals and frequency dependent insertion loss from the data cables are measured for both Tx and Rx. The measured impairments are used to calculate Tx and Rx impairment compensation settings for the data cable. The Tx impairment compensation settings are saved and applied to Tx data to compensate Tx impairments on the data signal when using the data cable to transmit data to an external device. Similarly, the Rx impairment compensation settings are saved and applied to Rx data to compensate Rx impairments on the data signal when using the data cable to receive data from the external device.

While the techniques are explained for communication devices using the full-duplex USB 3.0 standard, the techniques disclosed may be applied with other communication standards, in full duplex or half-duplex. Hereinafter, various embodiments of the present disclosure will be explained in further detail with reference to the accompanying figures.

Figure 1:
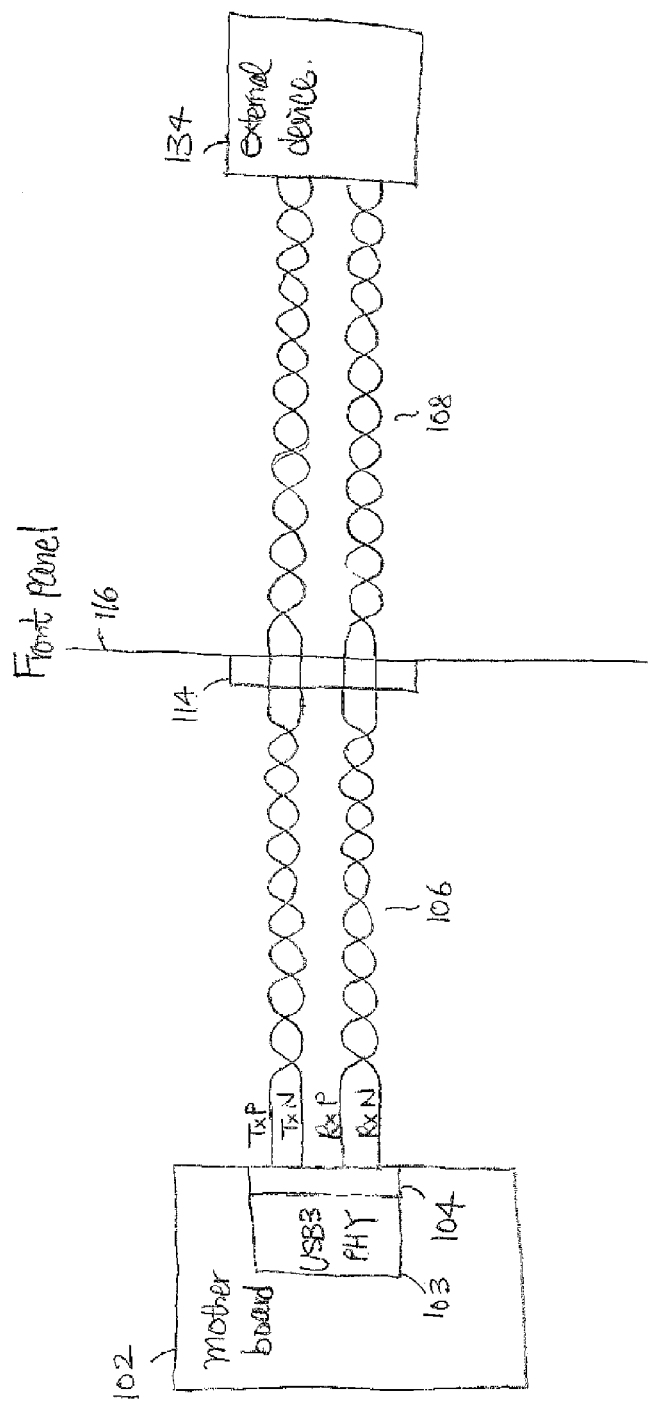
FIG. 1 shows a USB host device on a motherboard of a computer connected to an external USB device through an internal cable and an external cable according to one or more embodiments of the present disclosure.

FIG. 1 shows a USB 3.0 (hereinafter simply USB) host device on a motherboard 102 of a computer connected to an external USB device 134 through an internal cable 106 and an external cable 108 according to one or more embodiments of the present disclosure. The motherboard 102 contains a USB physical layer device (PHY) 103 which generates Tx data and receives Rx data through a host USB port 104. Full duplex data signals from host USB port 104 include a differential pair of transmit signals TxP, TxN and a differential pair of receive signals RxP, RxN. Differential signals TxP/TxN, RxP/RxN are carried on twisted pairs of wires through the internal cable 106 that is connected to host USB port 104 on one end and connected to a front panel USB port 114 on a front panel 116 of the computer on the other end. The external cable 108 carries the differential signals from front panel 116 to the external device 134. Thus, USB host device 103 of the computer and external device 134 communicate through internal cable 106 and external cable 108.

Signal impairments on TxP/TxN, RxP/RxN are introduced by both internal cable 106 and external cable 108. These signal impairments may include frequency dependent insertion loss on TxP/TxN, RxP/RxN, and intra-pair skews between differential signals TxP/TxN, and between RxP/RxN. While the USB standard specifies limits on insertion loss and intra-pair skews for TxP/TxN and RxP/RxN through external cable 108, the limits for internal cable 106 are not as well defined. Therefore, it is desirable to measure insertion loss and intra-pair skews on TxP/TxN, RxP/RxN introduced by internal cable 106 during a calibration phase. The measurements are stored and used to compensate insertion loss and intra-pair skews on TxP/TxN, RxP/RxN during actual operation of the USB host device 103 with internal cable 106.

Figure 2:
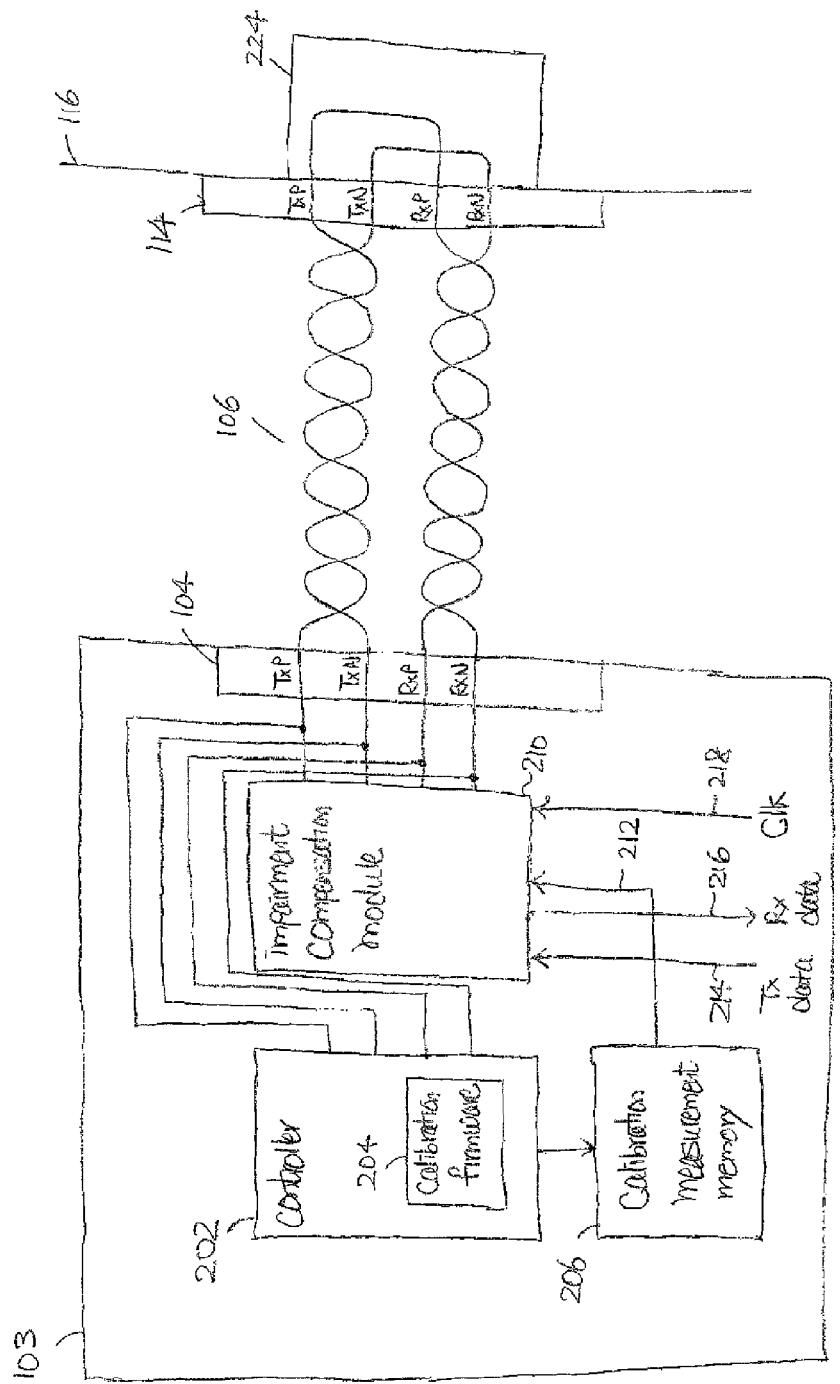
FIG. 2 shows a block diagram of a signal impairment calibration and compensation system of the USB host device of FIG. 1 used to perform calibration of signal impairments introduced by an internal cable connected to the USB device during a calibration phase according to one or more embodiments of the present disclosure.

FIG. 2 shows a block diagram of a signal impairment calibration and compensation system of the USB host device (e.g., USB PHY 103) of FIG. 1 used to perform calibration of signal impairments introduced by an internal cable connected to the USB device during a calibration phase according to one or more embodiments of the present disclosure. The USB host device has a controller 202 that runs calibration firmware 204 to transmit calibration signals onto the twisted pair carrying TxP/TxN of internal cable 106. The calibration phase uses a loop back test in which the calibration signals on TxP/TxN are looped back as RxP/RxN at front panel 114. This is accomplished by attaching a calibration connector 224 to front panel USB port 114 of the computer so that the twisted pair of internal cable 106 carrying TxP/TxN is connected to the twisted pair carrying RxP/RxN. The calibration signals are thus looped back and received by controller 202.

Calibration firmware 204 running on controller 202 measures insertion loss by comparing the received calibration signals with the transmitted calibration signals. From the measurement, controller 202 determines the insertion loss attributable to the twisted pair of internal cable 106 carrying TxP/TxN and saves it as Tx insertion loss into a calibration measurement memory 206. Similarly, controller 202 determines the Rx insertion loss attributable to the twisted pair of internal cable 106 carrying RxP/RxN internal cable 106 and saves it as Rx insertion loss into calibration measurement memory 206.

From the received calibration signals, controller 202 also determines the intra-pair skew introduced by the twisted pair carrying TxP/TxN and saves it as Tx intra-pair skew into calibration measurement memory 206. Similarly, controller 202 determines the intra-pair skew introduced by the twisted pair carrying RxP/RxN and saves it as Rx intra-pair skew into calibration measurement memory 206. In one embodiment, calibration measurement memory 206 may be implemented as a non-volatile memory so that the impairment compensation settings are saved even after power to the computer is turned off. The calibration phase may be run during a system characterization step after a new internal cable is connected to the USB host device.

After the calibration phase, calibration connector 224 is removed and an external cable may be connected as in FIG. 1 for the USB host device to communicate with an external USB device. An impairment compensation module 210 reads the impairment compensation settings from calibration measurement memory 206 and applies the settings to TxP/TxN and RxP/RxN. For example, impairment compensation module 210 applies compensation settings for Tx insertion loss and Tx intra-pair skew to transmit data Tx data 214 to generate TxP/TxN. TxP/TxN is thus compensated for the insertion loss and the intra-pair skew introduced by the twisted pair carrying TxP/TxN of internal cable 106. Similarly, impairment compensation module 210 applies compensation settings for Rx insertion loss and Rx intra-pair skew to RxP/RxN to generate received data Rx data 216. RxP/RxN is thus compensated for the insertion loss and the intra-pair skew introduced by the twisted pair carrying RxP/RxN of internal cable 106.

Figure 3:
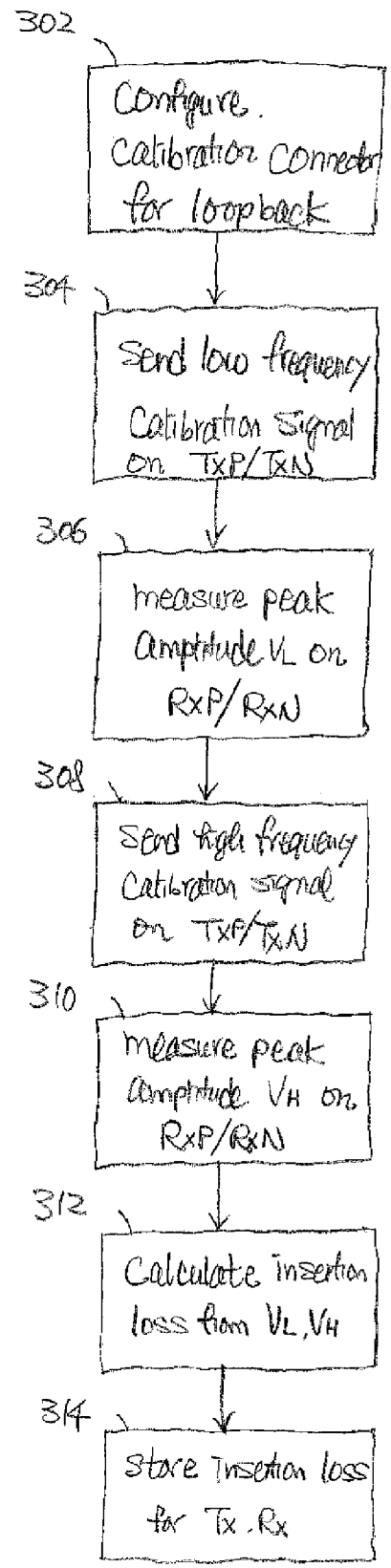
FIG. 3 shows a flow chart of a method for calibrating a transmit and receive insertion loss through an internal cable using the system of FIG. 2 according to one or more embodiments of the present disclosure.

FIG. 3 shows a flow chart of a method for calibrating Tx and Rx insertion loss introduced by an internal cable using the set up of FIG. 2 according to one or more embodiments of the present disclosure. The method starts at step 302, where calibration connector 224 is used to connect the twisted pair carrying TxP/TxN to the twisted pair carrying RxP/RxN as shown in FIG. 2 for looping back TxP to RxP, and TxN to RxN. In step 304, controller 202 transmits a low frequency calibration signal of a known amplitude onto the twisted pair carrying TxP/TxN. In one embodiment, the frequency of the low frequency calibration signal is 2.5 GHz/8. The low frequency calibration signal is looped back onto the twisted pair carrying RxP/RxN and its peak amplitude $V_L$ is measured by controller 202 in step 306. Due to the insertion loss introduced by the twisted pairs, the amplitude of the received calibration signal is attenuated from that of the transmitted calibration signal.

In step 308, controller 202 transmits a high frequency calibration signal with the same amplitude as that of the low frequency calibration signal onto the twisted pair carrying TxP/TxN. In one embodiment, the frequency of the high frequency calibration signal is 2.5 GHz, or 8 times of the frequency of the low frequency calibration signal. The high frequency calibration signal is similarly looped back onto the twisted pair carrying RxP/RxN and its peak amplitude $V_H$ is measured by controller 202 in step 310.

In step 312, controller 202 calculates the ratio of $V_H/V_L$ as the combined insertion loss introduced by the two twisted pairs carrying TxP/TxN, RxP/RxN, and by calibration connector 224. The combined insertion loss may be expressed in dB (decibel) by calculating $10*\log(V_H/V_L)$. In one or more embodiments, it is assumed that the insertion loss introduced by the two twisted pairs is the same and that the insertion loss from calibration connector 224 is negligible. Accordingly, the square root of $V_H/V_L$, or alternatively half of $V_H/V_L$ expressed in dB is taken as value for the Tx insertion loss and the Rx insertion loss. Thus, Tx insertion loss and Rx insertion loss represent the measured insertion loss for the signal frequency of interest attributable to the twisted pair carrying TxP/TxN and RxP/RxN, respectively. In step 314, the Tx insertion loss and the Rx insertion loss are saved into calibration measurement memory 206.

Figure 4:
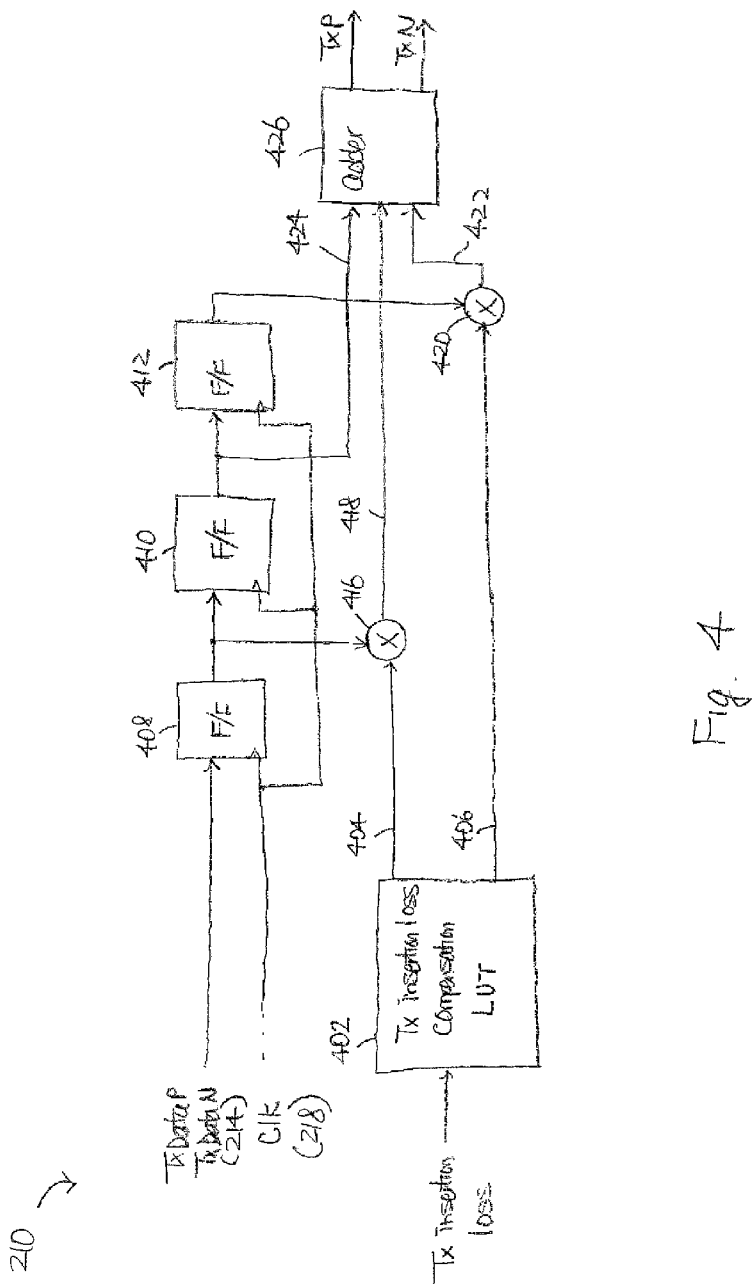
FIG. 4 shows a block diagram of portions of an impairment compensation module used to compensate the transmit insertion loss of an internal cable when transmitting USB signals through the internal cable according to one or more embodiments of the present disclosure.

FIG. 4 shows a block diagram of portions of an impairment compensation module 210 of FIG. 2 used to compensate the Tx insertion loss of an internal cable 106 when transmitting USB signals through the internal cable according to one or more embodiments of the present disclosure. A three-tap FIR (finite impulse response) filter is used for the Tx insertion loss compensation by adjusting the amplitude of TxP/TxN as a function of signal frequency. Alternatively, FIR filters with a different number of taps or other types of filters or adaptive equalizer may be used.

In one embodiment, the flip-flops (F/F) for the three-tap FIR filter are an early tap 408, a center tap 410, and a late tap 412. Tx data 214 to be transmitted from the host USB device is received by the three-tap FIR filter and is successively clocked through early tap 408, center tap 410, and late tap 412 with a clock signal CLK 218. In one or more embodiments, Tx data 214 may have already been compensated for Tx intra-pair skew when received as TxDataP and TxDataN for Tx insertion loss compensation. TxDataP and TxDataN may be processed in parallel FIR filters using duplicate tap coefficients but with separate clocks to generate TxP/TxN, respectively. Alternatively, Tx data 214 may be compensated first for Tx insertion loss and then for Tx intra-pair skew. Tx data 214 may thus be received as a single-ended signal by a single three-tap FIR filter and then subsequently expanded into TxP/TxN when compensating for Tx intra-pair skew. In yet another alternative embodiment, Tx data 214 may be compensated for Tx insertion loss and for Tx intra-pair skew in an integrated approach. Tx data 214 may thus be received as a single-ended signal by two parallel three-tap FIR filters with duplicate tap coefficients. Each of the two parallel three-tap FIR filters is clocked by its own clock adjusted for intra-pair skew to generate TxP/TxN that is compensated for both Tx insertion loss and intra-pair skew.

The coefficient for center tap 410 is set to 1. The coefficient for early tap 408 is early tap coefficient 404, and the coefficient for late tap 412 is late tap coefficient 406. In one or more embodiments, early tap coefficient 404 and late tap coefficient 406 are less than 1. Early tap coefficient 404 and late tap coefficient 406 are stored and read from a Tx insertion loss compensation look up table (LUT) 402. Tx insertion loss saved in calibration measurement memory 206 is used as a read address for Tx insertion loss compensation LUT 402 to read out early tap coefficient 404 and late tap coefficient 406. Thus, early tap coefficient 404 and late tap coefficient 406 represent the FIR coefficients used to compensate TxP/TxN for the measured Tx insertion loss.

A first multiplier 416 multiplies data of early tap 408 with early tap coefficient 404 to generate early tap product 418. Similarly, a second multiplier 420 multiplies data of late tap 412 with late tap coefficient 406 to generate late tap product 422. As mentioned, the tap coefficient for center tap 410 is 1. Therefore, no multiplier is necessary for center tap data 424. An adder 426 sums early tap product 418, center tap data 424, and late tap product 422 to generate TxP/TxN.

Figure 5:
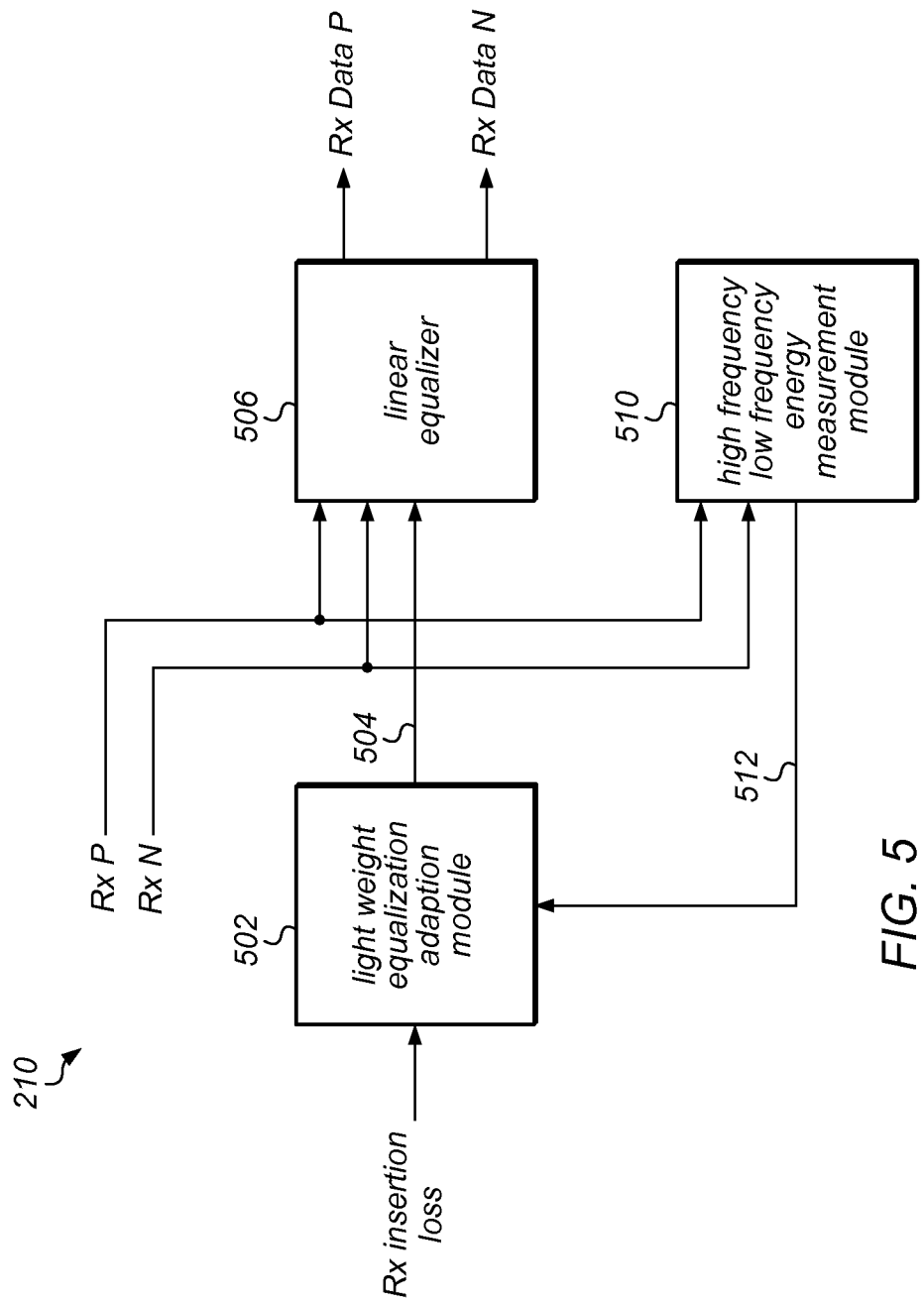
FIG. 5 shows a block diagram of portions of an impairment compensation module used to compensate the receive insertion loss of an internal cable when receiving USB signals through the internal cable according to one or more embodiments of the present disclosure.

FIG. 5 shows a block diagram of portions of an impairment compensation module 210 used to compensate the Rx insertion loss of an internal cable 106 when receiving USB signals through the internal cable according to one or more embodiments of the present disclosure. A continuous time linear equalizer 506 is used to compensate RxP/RxN for Rx insertion loss.

Equalization coefficients 504 for continuous time linear equalizer 506 are received from a light weight equalization adaptation module 502. Equalization coefficients 504 may have a nominal value to boost high frequency signals on RxP/RxN to compensate for the higher Rx insertion loss associated with a higher data rate. This nominal value is based on the Rx insertion loss received from calibration measurement memory 206 and thus compensates for the Rx insertion loss attributable to internal cable 106. For example, continuous time linear equalizer 506 may receive equalization coefficients 504 to boost high frequency signals on RxP/RxN by approximately 3-4 dB.

However, as the Rx insertion loss on RxP/RxN is a combination of Rx insertion loss introduced by external cable 108 as well as by internal cable 106, it is also desirable to compensate for the Rx insertion loss attributable to external cable 108. Therefore, a high frequency/low frequency energy measurement module 510 may be used to measure the energy of high frequency components and the energy of low frequency components of RxP/RxN. A ratio of the energies of the two frequency components may be generated as an equalization coefficient adjustment signal 512 for light weight equalization adaptation module 502 to adaptively adjust the nominal value of equalization coefficients 504. As the name for light weight equalization adaptation module 502 suggests, equalization coefficients 504 may be adaptively adjusted in a simplified manner compared to a full-fledged equalization adaptation algorithm at a cost of decreased performance.

In one or more embodiments, RxP/RxN may be compensated for Rx insertion loss first before compensating for Rx intra-pair skew. RxDataP/RxDataN from linear equalizer 506 would then be compensated for Rx intra-pair skew before bit slicing to generate RxData 216. Alternatively, RxP/RxN as received by linear equalizer 506 for Rx insertion loss compensation may already have been compensated for Rx intra-pair skew. The output of linear equalizer 506 designated as RxDataP/RxDataN may thus be provided to a slicer to generate RxData 216.

Figure 6:
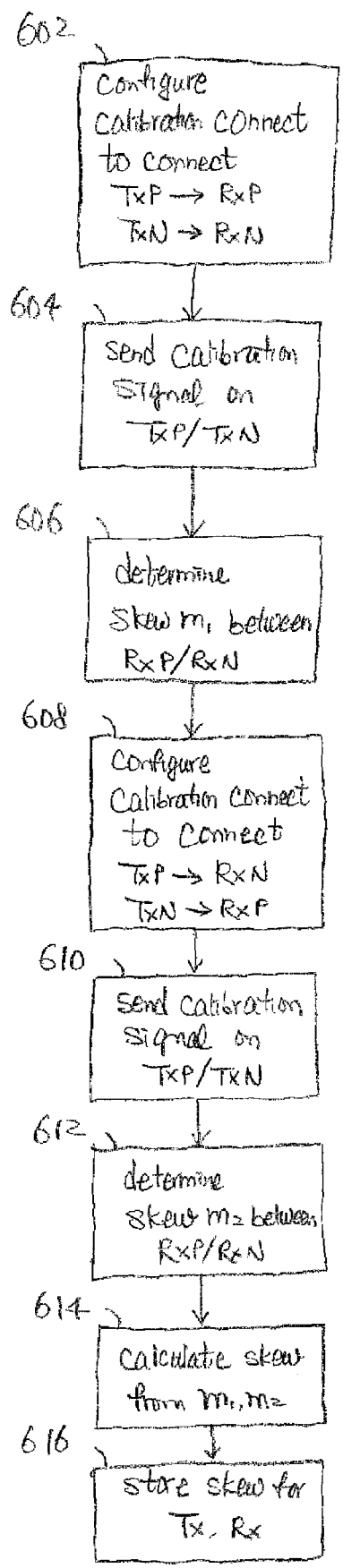
FIG. 6 shows a flow chart of a method for calibrating a transmit and receive intra-pair skew through an internal cable using the system of FIG. 2 according to one or more embodiments of the present disclosure.

FIG. 6 shows a flow chart of a method for calibrating Tx and Rx intra-pair skews through an internal cable using the set up of FIG. 2 according to one or more embodiments of the present disclosure. The method starts at step 602, where a first type of calibration connector 224 is used to connect the twisted pair carrying TxP/TxN to the twisted pair carrying RxP/RxN as shown in FIG. 2 for looping back TxP to RxP, and TxN to RxN. In step 604, controller 202 transmits a skew calibration signal for TxP/TxN. The skew calibration signal may be a pulse or other type of signal that allows the intra-pair skew of the looped back signal to be measured.

The skew calibration signal is looped back as RxP/RxN and the intra-pair skew M1 between RxP/RxN is measured in step 606 by controller 202. As an example, the intra-pair skew may be measured using multiphase clocks having equally phased offsets as disclosed in U.S. patent application Ser. No. 13/035,331, filed Feb. 25, 2011, entitled "Multiphase Clock Generation and Calibration," which is incorporated herein by reference in its entirety. If signal delays on the twisted pair carrying TxP/TxN are designated $D_{TxP}$ and $D_{TxN}$, respectively, and signal delays on the twisted pair carrying RxP/RxN are designated $D_{RxP}$ and $D_{RxN}$, respectively, the signal delay from the transmission of TxP to the reception of RxP by controller 202 is $D_{TxP}+D_{RxP}$. Similarly, the signal delay from the transmission of TxN to the reception of RxN by controller 202 is $D_{TxN}+D_{RxN}$. It is assumed that the signal delay of the skew calibration signal through calibration connector 224 is negligible, or at the very least, the intra-pair skew on TxP/TxN to RxP/RxN introduced by calibration connector 224 is negligible. Therefore, M1 may be calculated as $(D_{TxP}+D_{RxP})-(D_{TxN}+D_{RxN})$.

In step 608, a second type of calibration connector 224 is used to loop back TxP to RxN, and TxN to RxP. Again in step 610, controller 202 transmits a skew calibration signal for TxP/TxN. The skew calibration signal may be the same as, or may be different from the skew calibration signal transmitted in step 604. However, the skew calibration signal transmitted on TxP is now looped back as RxN, and the skew calibration signal transmitted on TxN is now looped back as RxP. In step 612, the intra-pair skew M2 between RxP/RxN is measured by control 202. The signal delay from the transmission of TxP to the reception of RxN by controller 202 is $D_{TxP}+D_{RxN}$. Similarly, the signal delay from the transmission of TxN to the reception of RxP by controller 202 is $D_{TxN}+D_{RxP}$. Therefore, M2 may be calculated as $(D_{TxP}+D_{RxN})-(D_{TxN}+D_{RxP})$.

In step 614, intra-pair skew between TxP/TxN attributable to the twisted-pair carrying TxP/TxN is calculated by taking the average of M1 and M2:

$$\frac{1}{2}(M1+M2) = 0.5*\{[(D_{TxP}+D_{RxP})-(D_{TxN}+D_{RxN})] + \qquad \text{(Eq. 1)}$$
$$[(D_{TxP}+D_{RxN})-(D_{TxN}+D_{RxP})]\}$$
$$= 0.5*\{2D_{TxP}-2D_{TxN}\}$$
$$= D_{TxP}-D_{TxN}$$

Similarly, intra-pair skew between RxP/RxN attributable to the twisted-pair carrying RxP/RxN is calculated by taking half of the difference between M1 and M2:

$$\frac{1}{2}(M1-M2) = 0.5*\{[(D_{TxP}+D_{RxP})-(D_{TxN}+D_{RxN})] - \qquad \text{(Eq. 2)}$$
$$[(D_{TxP}+D_{RxN})-(D_{TxN}+D_{RxP})]\}$$
$$= 0.5*\{2D_{RxP}-2D_{RxN}\}$$
$$= D_{RxP}-D_{RxN}$$

In step 616, the intra-pair skew $D_{TxP}-D_{TxN}$ is stored into calibration measurement memory 206 as Tx intra-pair skew. Similarly, the intra-pair skew $D_{RxP}-D_{RxN}$ is stored into calibration measurement memory 206 as Rx intra-pair skew.

Figure 7:
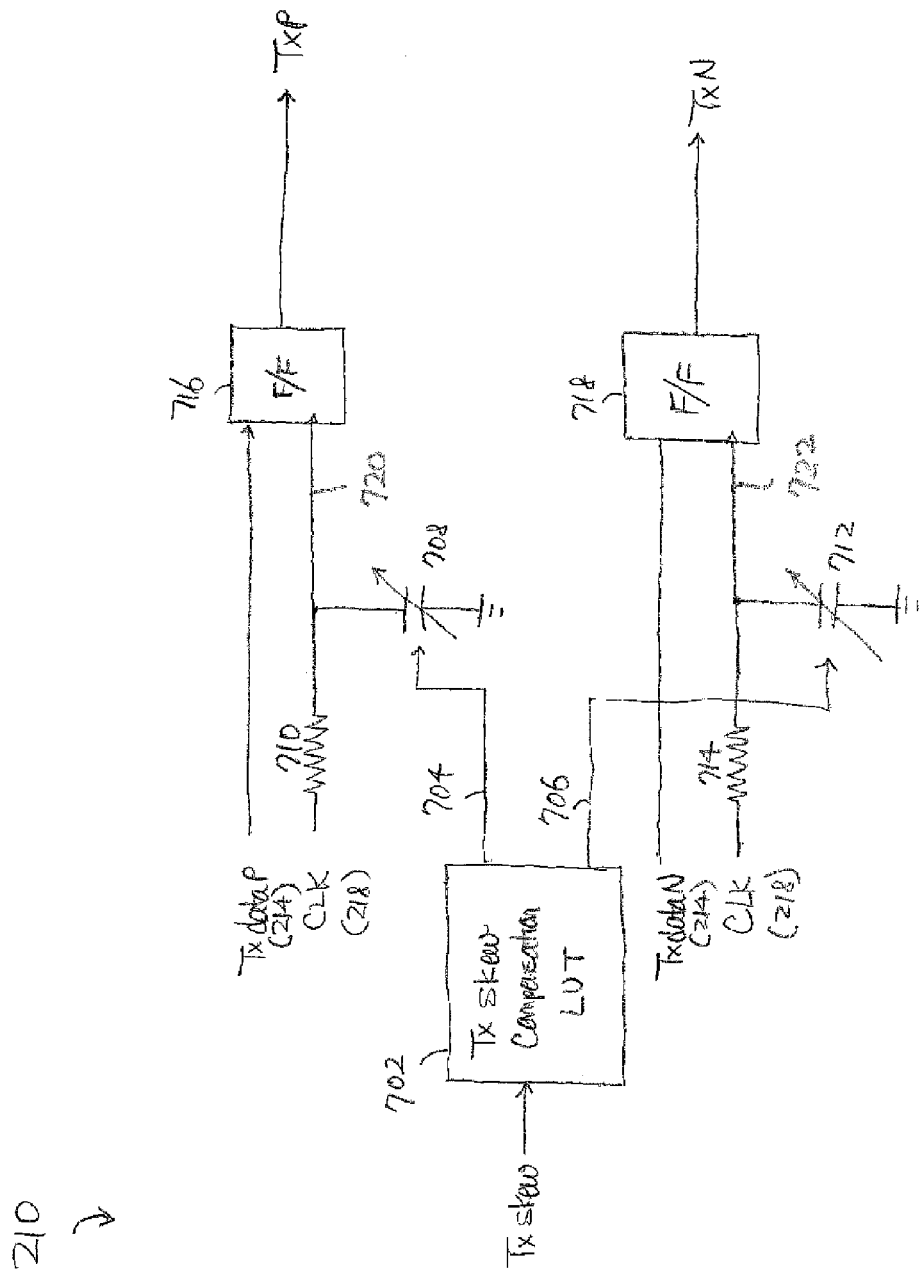
FIG. 7 shows a block diagram of portions of an impairment compensation module used to compensate the transmit intra-pair skew of an internal cable when transmitting USB signals through the internal cable according to one or more embodiments of the present disclosure.

FIG. 7 shows a block diagram of portions of an impairment compensation module 210 used to compensate the Tx intra-pair skew of an internal cable 106 when transmitting USB signals through the internal cable according to one or more embodiments of the present disclosure. Tx data 214 to be transmitted from the host USB device may be received as differential pair TxDataP and TxDataN. TxDataP and TxDataN are individually compensated for Tx intra-pair skew by selectively delaying clocks used to generate TxP/TxN from TxDataP/TxDataN. For example, if the Tx intra-pair skew measured during the calibration phase indicates that the twisted-pair carrying TxP/TxN TxP delays TxP more than TxN, then a corresponding delay may be introduced onto the clock to delay TxN to offset the delay on TxP.

Clock delays for generating TxP and TxN are TxP clock delay 704 and TxN clock delay 706, respectively. TxP clock delay 704 and TxN clock delay 706 are stored and read from a Tx skew compensation LUT 702. The Tx intra-pair skew saved in calibration measurement memory 206 is used as a read address for Tx skew compensation LUT 702 to read out TxP clock delay 704 and TxN clock delay 706.

In one embodiment, clock delays are realized with RC (resistor-capacitor) networks in which varactors, or switch capacitors are used to adjust the clock delays. For example, a TxP clock 720 is delayed using a RC network of a TxP resistor 710 connected in series with a TxP varactor 708. TxP clock delay 704 from Tx skew compensation LUT 702 adjusts the capacitance of TxP varactor 708 to change the RC constant to effect delays on TxP clock 720. Similarly, a TxN clock 722 is delayed using a RC network of a TxN resistor 714 connected in series with a TxN varactor 712. TxN clock delay 706 from Tx skew compensation LUT 702 adjusts the capacitance of TxN varactor 712 to change the RC constant to effect delays on TxN clock 722. In other embodiments, clock delays may alternatively be a network of line delay taps, each tap selectively switched by outputs of Tx skew compensation LUT 702.

A TxP F/F 716 uses TxP clock 720 to clock in TxDataP. Similarly, a TxN F/F 718 uses TxN clock 722 to clock in TxDataN. Thus, TxP clocked out of TxP F/F 716 and TxN clocked out of TxN F/F 718 are skewed with respect to one another to compensate for the Tx intra-pair skew introduced by the twisted pair carrying TxP/TxN. TxP/TxN may subsequently be compensated for Tx insertion loss by providing TxP/TxN to the block diagram of FIG. 4.

Figure 8:
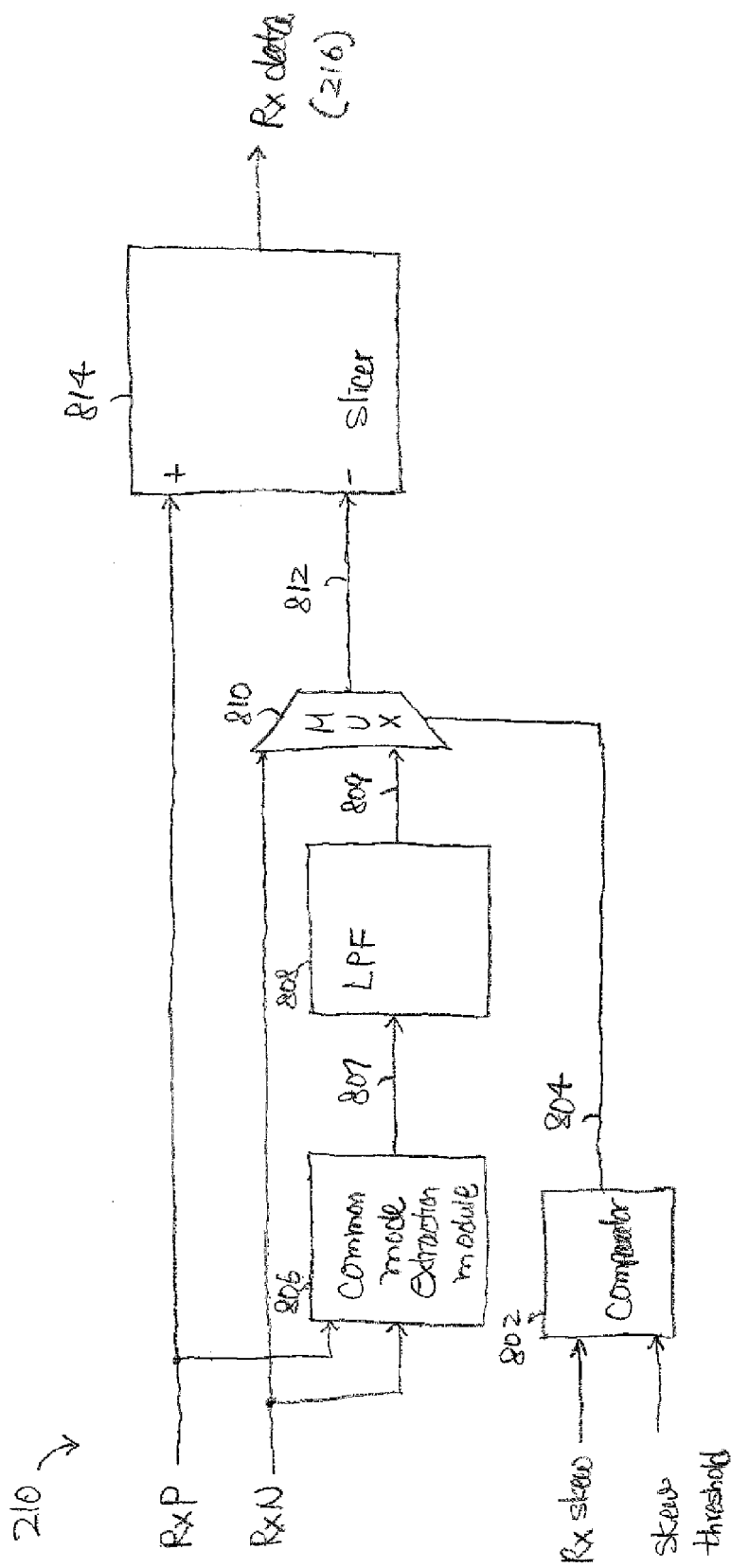
FIG. 8 shows a block diagram of portions of an impairment compensation module used to compensate the receive intra-pair skew of an internal cable when receiving USB signals through the internal cable according to one or more embodiments of the present disclosure.

FIG. 8 shows a block diagram of portions of an impairment compensation module 210 used to compensate the Rx intra-pair skew of an internal cable 106 when receiving USB signals through the internal cable according to one or more embodiments of the present disclosure. Differential signals RxP and RxN are compensated for intra-pair skew through common mode extraction and filtering. A common mode extraction module 806 receives RxP/RxN and determines the common mode between them. In one or more embodiments, the common mode may be calculated as an average of RxP and RxN.

In one or more embodiments, differential signals RxP/RxN may be compensated first for Rx insertion loss followed by compensating for Rx intra-pair skew. Therefore, RxP/RxN received by FIG. 8 may then be the RxDataP/RxDataN signals from linear equalizer 506 of FIG. 5 that have been compensated for the Rx insertion loss. The common mode of a pair of ideal differential signals is zero. If there is intra-pair skew, the common mode may deviate from zero. A common mode error signal 807 is generated by a common mode extraction module 806 and filtered by a common mode LPF (low pass filter) 808 to generate a filtered common mode error 809 as an indication of the intra-pair skew. In one or more embodiments, common mode LPF 808 may be an RC filter. Filtered common mode error 809 may be substituted for RxN as an input to a bit slicer 814. Bit slicer 814 calculates the difference between RxP and filtered common mode error 809 to make a hard decision on Rx data 216. However, because filtered common mode error 809 has a voltage level close to zero instead of the full voltage swing of RxN, bit slicer 814 incurs a 6 dB loss in SNR (signal-to-noise ratio) when using RxP minus filtered common mode error 809 for bit slicing compared to using RxP minus RxN for bit slicing. Therefore, it is desirable to use filtered common mode error 809 for bit slicing only when the intra-pair skew on RxP/RxN is significant.

Intra-pair skew on RxP/RxN is a combination of intra-pair skews introduced by external cable 108 as well as by internal cable 106. Because external cable 108 has to be in compliance with limits on signal impairments set by the USB standard, it is likely that the intra-pair skew attributable to internal cable 106 is more than that attributable to external cable 108. The intra-pair skew attributable to internal cable 106 was measured during the calibration phase and was stored as the Rx intra-pair skew in calibration measurement memory 206. Therefore, the measured Rx intra-pair skew from internal cable 106 may be a good indicator of the over-all intra-pair skew on RxP/RxN. Accordingly, the Rx intra-pair skew is compared with a skew threshold by an Rx comparator 802. The skew threshold may be an adjustable threshold set by controller 202. Rx comparator 802 generates a select signal 804 based on the comparison. If the Rx intra-pair skew exceeds the skew threshold, the intra-pair skew on RxP/RxN is likely to be significant. Accordingly, select signal 804 is used by multiplexor 810 to select filtered common mode error 809 as a minus input 812 to bit slicer 814 to compensate RxP/RxN for intra-pair skew at a cost of a 6 dB loss in SNR. Otherwise, if the Rx intra-pair skew does not exceed the skew threshold, the intra-pair skew on RxP/RxN is not likely to be significant. RxN is then selected as minus input 812 to bit slicer 814 and RxP/RxN is not compensated for intra-pair skew while preserving the full SNR. Therefore, FIG. 8 discloses a switchable intra-pair skew compensation approach that bypasses the compensation if the intra-pair skew is not likely to be significant.

The various components described herein may be implemented with appropriate hardware and/or software to perform the various operations described herein. For example, in various embodiments, such components may include one or more processors, logic, memory, non-transitory machine readable instructions (e.g., software, firmware, or other instructions stored in a memory or a machine readable medium), and/or other components as may be desired in particular implementations.

Where applicable, various embodiments provided by the present disclosure can be implemented using hardware, software, or combinations of hardware and software. Also where applicable, the various hardware components and/or software components set forth herein can be combined into composite components comprising software, hardware, and/or both without departing from the spirit of the present disclosure. Where applicable, the various hardware components and/or software components set forth herein can be separated into sub-components comprising software, hardware, or both without departing from the spirit of the present disclosure. In addition, where applicable, it is contemplated that software components can be implemented as hardware components, and vice-versa.

Software in accordance with the present disclosure, such as program code and/or data, can be stored on one or more non-transitory machine readable mediums. It is also contemplated that software identified herein can be implemented using one or more general purpose or specific purpose computers and/or computer systems, networked and/or otherwise. Where applicable, the ordering of various steps described herein can be changed, combined into composite steps, and/or separated into sub-steps to provide features described herein.

Embodiments described above illustrate but do not limit the invention. It should also be understood that numerous modifications and variations are possible in accordance with the principles of the present invention. Accordingly, the scope of the invention is defined only by the following claims.

What is claimed is:

1. A method for compensating signal impairment within an electronic device comprising an external interface socket operable to receive a single connector and comprising a bidirectional connection, a communication device and a transmission connection within the electronic device from the communication device to the external interface socket and a reception connection within the electronic device from the external interface socket to the communication device, the method comprising:

connecting a single loop back connector into the external interface socket thereby shorting the transmission connection with the reception connection directly at the external interface socket such that a signal sent from the communication device is transmitted through the transmission connection to the external interface socket and through the loop back connector into the reception connection back to the communication device;

transmitting a calibration signal from the communication device into the transmission connection;
receiving the calibration signal through the reception connection as a looped back signal at the communication device;
measuring the looped back signal;
determining from the measuring of the looped back signal the signal impairment introduced by the transmission and reception connections, wherein the signal impairment comprises a transmit impairment on signals transmitted from the communication device through the transmission connection and a receive impairment on signals received by the communication device through the reception connection;
removing the single loop back connector;
adjusting the signals transmitted from the communication device through the cable to compensate for the transmit impairment; and
adjusting the signals received by the communication device through the cable to compensate for the receive impairment.

2. The method of claim 1, wherein the signal impairment comprises an insertion loss on signal power introduced by the transmission and reception connection, wherein the transmit impairment comprises a transmit insertion loss, and wherein the receive impairment comprises a receive insertion loss.

3. The method of claim 2, wherein the transmitting a calibration signal comprises:
transmitting a first calibration signal, wherein the first calibration signal has a peak amplitude and a first frequency and; and
transmitting a second calibration signal, wherein the second calibration signal has the peak amplitude and a second frequency higher than the first frequency.

4. The method of claim 2, wherein the adjusting the signals transmitted from the communication device comprises adjusting an amplitude of a transmit signal as a function of a frequency using the transmit insertion loss.

5. The method of claim 2, wherein the signal impairment further comprises an intra-pair skew on a pair of differential signals, wherein the transmit impairment comprises a transmit intra-pair skew on a pair of transmit differential signals, and wherein the receive impairment comprises a receive intra-pair skew on a pair of receive differential signals.

6. The method of claim 3, wherein the measuring the looped back signal comprises:
measuring a peak amplitude of a first looped back signal associated with the first calibration signal;
measuring a peak amplitude of a second looped back signal associated with the second calibration signal; and
calculating a ratio of the peak amplitudes of the first and second looped back signals as a combined insertion loss.

7. The method of claim 6, wherein the determining comprises determining the transmit insertion loss to be half of the combined insertion loss and determining the receive insertion loss to be half of the combined insertion loss.

8. The method of claim 5, wherein the configuring a second end of the cable and transmitting a calibration signal comprise:
configuring the transmission/reception connection to loop back the transmit differential signals to a corresponding polarity of the receive differential signals;
transmitting a first calibration signal on the transmit differential signals;
configuring the cable to loop back the transmit differential signals to a opposite polarity of the receive differential signals; and transmitting a second calibration signal on the transmit differential signals.

9. The method of claim 5, wherein the adjusting the signals transmitted from the communication device comprises delaying a signal of the transmit differential signals to offset the transmit intra-pair skew.

10. The method of claim 8, wherein the measuring the looped back signal comprises:
measuring a first receive intra-pair skew on the receive differential signals looped back from the first calibration signal; and
measuring a second receive intra-pair skew on the receive differential signals looped back from the second calibration signal.

11. The method of claim 10, wherein the determining comprises determining the transmit intra-pair skew to be half of a sum of the first receive intra-pair skew and the second receive intra-pair skew.

12. The method of claim 10, wherein the determining comprises determining the receive intra-pair skew to be half of the first intra-pair skew minus the second receive intra-pair skew.

13. An electronic device comprising:
a housing comprising an external interface socket operable to receive a single connector and comprising a bidirectional connection;
a controller, wherein during calibration the controller is adapted to transmit a calibration signal from a communication device to calibrate a transmit impairment and a receive impairment introduced by an internal connection between the communication device and the external interface socket, the internal connection comprising a transmission connection and a reception connection,
a single loop back connector configured to be inserted into the external interface socket during calibration to loop back the calibration signal;
a calibration measurement memory adapted to store the transmit impairment and the receive impairment from the controller; and
an impairment compensation module adapted to receive the transmit impairment and the receive impairment from the calibration measurement memory, to adjust signals transmitted from the communication device to compensate for the transmit impairment, and to adjust signals received by the communication device to compensate for the receive impairment.

14. The apparatus of claim 13, wherein the controller is further adapted to measure the calibration signal looped back through the loop back connector inserted into the external interface socket, to determine the transmit impairment and the receive impairment from the measured calibration signal, wherein the transmit impairment is an impairment on signals transmitted from the communication device introduced by the transmission connection and the receive impairment is an impairment on signals received by the communication device introduced by the reception connection.

15. The apparatus of claim 13, wherein the receive impairment comprises a receive insertion loss, and wherein the impairment compensation module comprises:
a continuous time linear equalizer adapted to boost an amplitude of a receive signal using a set of equalization coefficients;
a energy measurement module adapted to calculate a ratio of energy of a high frequency component and a low frequency component of the received signal; and
a light weight equalization adaptation module adapted to adjust the set of equalization coefficients using the calculated ratio and the receiver insertion loss.

16. The apparatus of claim 13, wherein the communication device is a Universal Serial Bus (USB) host, and wherein the cable is adapted to transmit and receive USB signals separately through said transmission and reception connections, respectively.

17. The apparatus of claim 13, wherein the transmit impairment comprises a transmit insertion loss, and wherein the impairment compensation module comprises:
   a finite impulse response filter adapted to adjust an amplitude of a transmit signal using a set of filter coefficients; and
   a look up table adapted to provide the set of filter coefficients based on the transmit insertion loss.

18. The apparatus of claim 17, wherein the transmit impairment further comprises a transmit intra-pair skew on a pair of transmit differential signals, and wherein the impairment compensation module comprises:
   a first delay element adapted to use a first clock delay to delay generation of a first signal of the transmit differential signals;
   a second delay element adapted to use a second clock delay to delay generation of a second signal of the transmit differential signals; and
   a look up table adapted to provide the first clock delay and the second clock delay based on the transmit intra-pair skew.

19. The apparatus of claim 17, wherein the receive impairment comprises a receive intra-pair skew on a pair of receive differential signals, and wherein the impairment compensation module comprises:
   a common mode extraction module adapted to determine a common mode signal between the receive differential signals;
   a low pass filter adapted to filter the common mode signal to generate a filtered common mode signal;
   a comparator adapted to compare the receive intra-pair skew with a skew threshold; and
   a bit slicer adapted to make a bit decision using a signal of the receive differential signals and the filtered common mode signal if the receive intra-pair skew exceeds the skew threshold, otherwise to make a bit decision using both receive differential signals.

20. A non-transitory machine readable medium adapted to store a plurality of non-transitory machine readable instructions which when executed by one or more processors of an electronic device, wherein the electronic device comprises a communication device and an transmission connection within the electronic device from the communication device to an external interface socket operable to receive a single connector and comprising a bidirectional connection and a reception connection within the electronic device from the external interface socket to the communication device, are adapted to cause the electronic device to:
   transmit a calibration signal from a communication device through the transmission connection to calibrate a signal impairment introduced by the transmission connection; wherein a single loop back connector is inserted into the external interface socket and configured to loop back the calibration signal through said reception connection;
   measure the calibration signal looped back through the reception connection;
   determine a transmit impairment on signals transmitted from the communication device introduced by the transmission connection;
   determine a receive impairment on signals received by the communication device introduced by the reception connection;
   adjust signals transmitted from the communication device to compensate for the transmit impairment; and
   adjust signals received by the communication device to compensate for the receive impairment.

* * * * *